Nov. 17, 1953   B. N. ASHTON   2,659,205
HYDRAULIC POWER CONTROL UNIT
Filed May 23, 1951   4 Sheets-Sheet 1

INVENTOR.
BENJAMIN N. ASHTON
BY Campbell, Brumbaugh, Free & Graves
ATTORNEYS

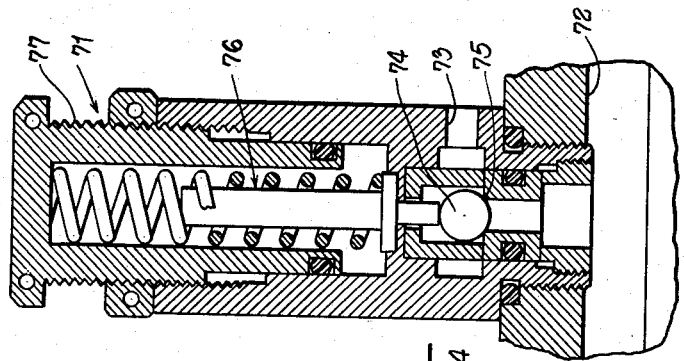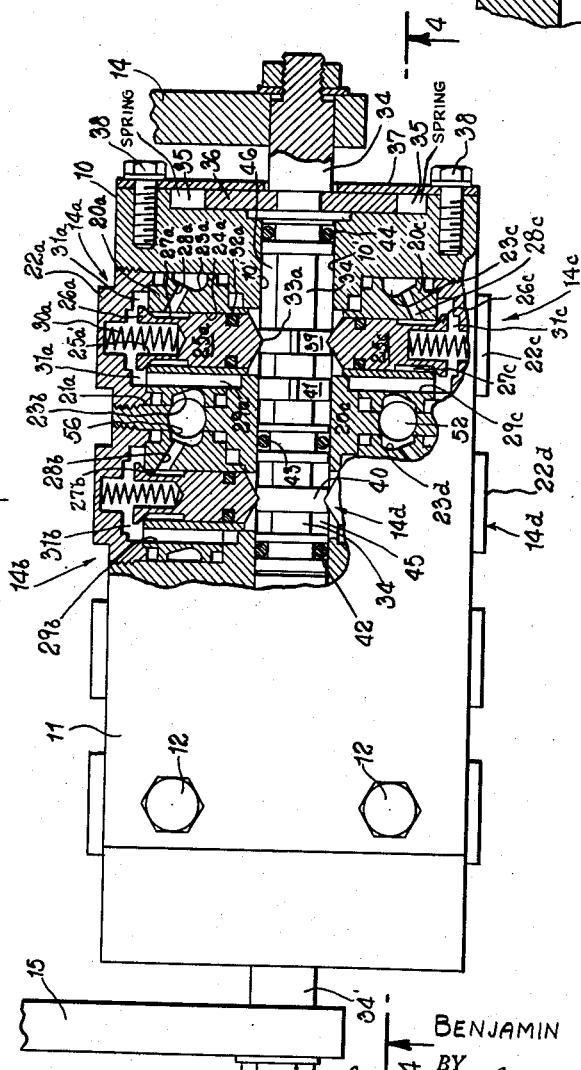

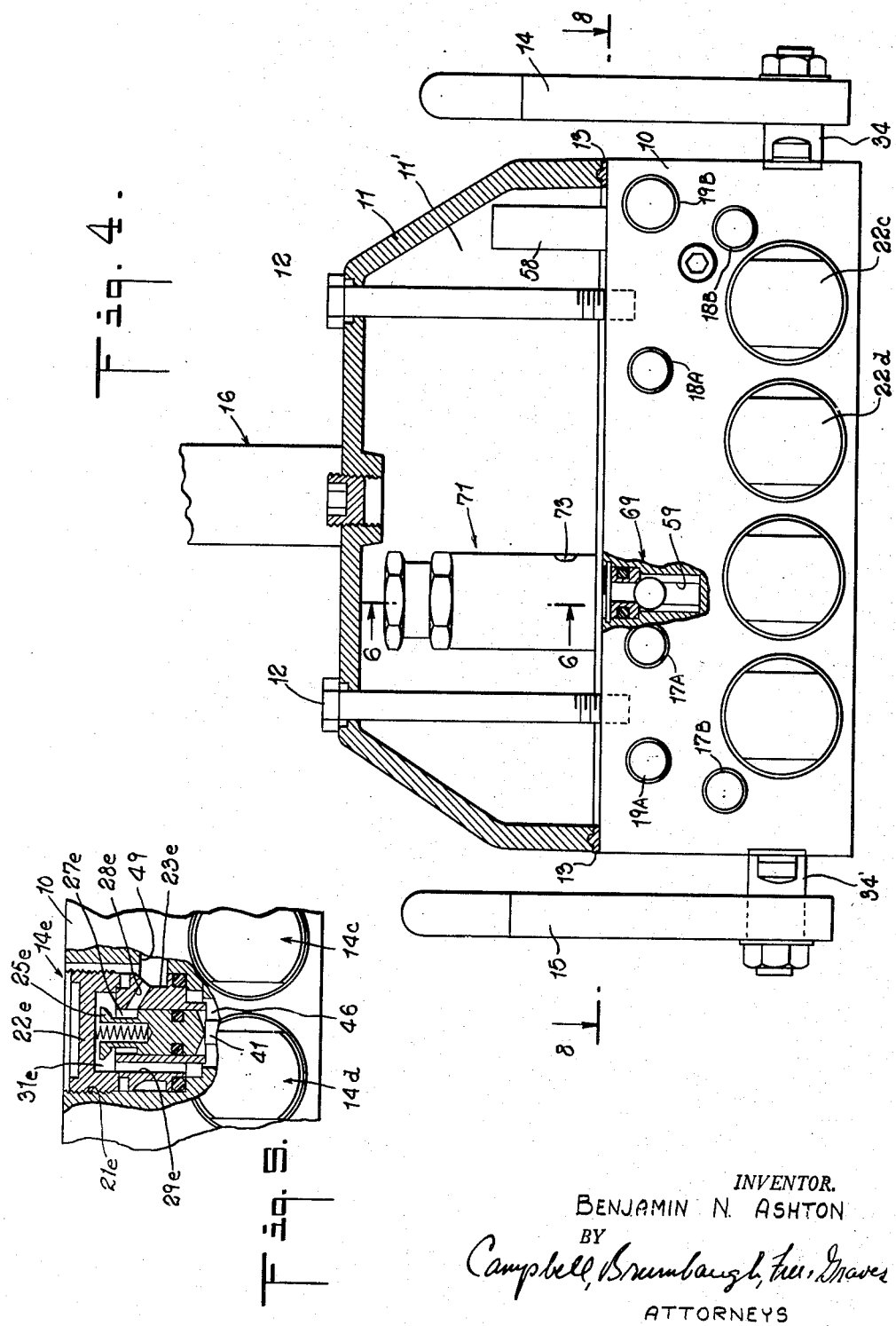

Nov. 17, 1953    B. N. ASHTON    2,659,205
HYDRAULIC POWER CONTROL UNIT
Filed May 23, 1951    4 Sheets-Sheet 4

INVENTOR.
BENJAMIN N. ASHTON
ATTORNEYS

Patented Nov. 17, 1953

2,659,205

UNITED STATES PATENT OFFICE 2,659,205

HYDRAULIC POWER CONTROL UNIT

Benjamin N. Ashton, Kingston, N. Y., assignor to Electrol Incorporated, Kingston, N. Y., a corporation of Delaware Application May 23, 1951, Serial No. 227,863

11 Claims. (Cl. 60—52)

This invention relates to hydraulic systems and more particularly to improved, unified hydraulic apparatus for selectively supplying hydraulic power to actuate equipment of the type used in the operation of aircraft, for example.

Hydraulic power has long been used as a driving medium in servo systems and the like, and its usefulness in this respect is dependent upon the efficiency of the apparatus by means of which the hydraulic power is developed and distributed. Such apparatus, particularly in the case of aircraft applications, should be light in weight, occupy minimum space, and withstand hard use under widely varied atmospheric conditions.

In accordance with the present invention, a supply of pressurized fluid may be utilized to actuate, selectively, equipment such as a pair of double-acting hydraulic jacks, the invention residing in a unified arrangement of balanced valves for supplying the pressurized fluid to either of two pairs of output-input lines from a single hydraulic pressure source.

A particular feature of the invention is the valve assembly for controlling the delivery of the hydraulic fluid to external apparatus as may be desired, but which permits a free flow of fluid through the assembly when the external apparatus is not being actuated. A further feature of the invention is the assembly of the valve system, hand pump, fluid reservoir, check valves and conduits into an integrated compact unit, thereby to simplify installation and repair problems.

The invention may be better understood from the following description of a preferred embodiment thereof taken in conjunction with the accompanying drawings in which:

Fig. 3 is a top view partially in section on the line 3—3 of Fig. 2 looking in the direction of the arrows;

Fig. 4 is a side view partially in section on the line 4—4 of Fig. 3 looking in the direction of the arrows;

Fig. 5 is a side view partially in section of one of the selector valves taken on the line 5—5 of Fig. 8;

Fig. 6 is a view in cross section of an adjustable relief valve utilized in the system and taken on the line 6—6 of Fig. 4;

Figure 1:
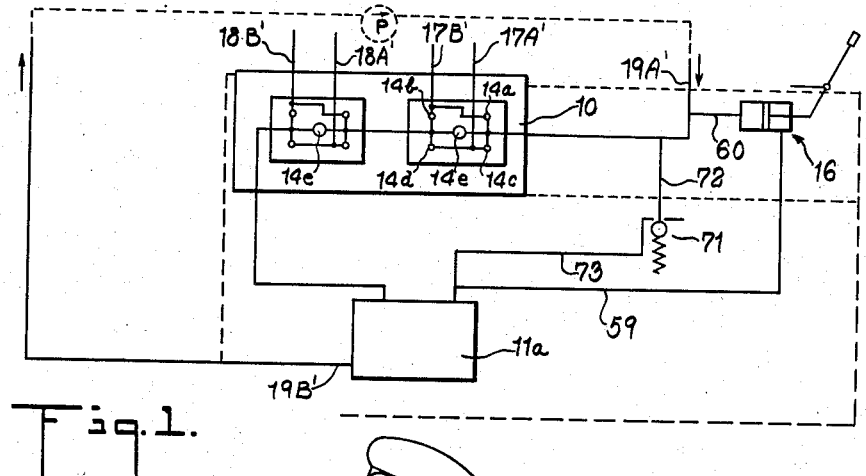
Fig. 1 is a schematic flow diagram of a system incorporating the instant invention.

Referring to the drawings and to Fig. 4 in particular, the invention is shown as embodied in a hydraulic control unit including a base portion 10 for housing conduit and selector valve assemblies (described in detail below) surmounted by an inverted shell portion 11 forming a fluid reservoir 11'. The two portions 10 and 11 are held together by through-bolts 12 and a gasket 13 may be provided at the joint to afford a fluid-tight seal. First and second control or hand levers 14 and 15, are disposed on opposite ends of the base portion for operating the selector valves, and a hand pump assembly 16 is mounted at the center of the unit on the front face thereof.

The illustrated unit is designed to control, selectively, the flow of liquid in two independent, output circuits which may lead to any desired hydraulic equipment such, for example, as double-acting hydraulic jacks (not shown). Each output circuit may include a supply and return line, and to this end, two sets of ports 17A—17B and 18A—18B are formed in the back wall of the base portion 10 for receiving connecting lines or conduits 17A'—17B' and 18A'—18B', respectively (shown schematically in Fig. 1). The flow of fluid in the cooperating ports 17A—17B is under the control of the hand lever 14 and the flow in the ports 18A—18B is under the control of the hand lever 15 and, as will be apparent from the following description, the hand levers may be used to shut off the flow or to establish a flow in either direction. Thus, the port 17A, for example, may at one time be a supply port and the port 17B a return port, and vice versa. The flow in the ports 18A—18B may likewise be controlled by the lever 15, and the flow in the two sets of ports may be controlled independently and from a single source of fluid under pressure, all as described below. The unit may be connected to an external, engine driven pump P (Fig. 1) by means of a pressure input conduit 19A' which connects to the unit at an input pressure port 19A (Fig. 4), a discharge or return conduit 19B', connected to the unit at a discharge port 19B, being provided as a return line to the pump.

Briefly, the unit utilizes a single source of fluid under pressure, which may be provided by the hand pump 16 or by the external pump P, or both, and, as stated above, the two output circuits may be utilized to operate two independent, double-acting hydraulic jacks (not shown) under the control of the hand levers 14 and 15.

The conduit and selector valve assemblies, whereby the fluid flow may be selectively controlled will now be described, referring first to Fig. 3 showing in cutaway section a portion of the valve assembly under the control of the hand lever 14.

The hand lever 14 is adapted to control a series of four horizontally disposed selector valve assemblies identified by the numerals 14a, 14b, 14c and 14d, respectively, and a single selector valve 14e (Fig. 5) which is disposed on a vertical axis. The five valve assemblies 14a . . . 14e are substantially identical and only one assembly need be described in detail, with like components of the other assemblies being designated by like numerals but with corresponding sub-characters. Thus referring to Fig. 3 the valve assembly 14a will be seen to include a stationary valve seat portion 20a received in a horizontal bore 21a (the bore 21e for receiving the valve 14e, however, is vertical as best seen in Fig. 5) formed in the base portion 10 and held in position by a cap or cover portion 22a threaded into the bore. The valve seat 20a is formed on its outer surface with an annular recess 23a forming in cooperation with the wall of the bore 21a a duct, hereinafter identified as duct 23a, for the hydraulic fluid. The valve seat is also formed with a central bore 24a which slidably receives a valve 25a. The outer end of the valve 25a is formed with an annular shoulder or rim 26a which engages the seat 20a when the valve is closed. Immediately beneath the shoulder 26a the valve is formed with a necked-in portion 27a defining in cooperation with the bore in the valve seat a fluid duct, hereinafter identified as duct 27a. Connecting the duct 27a to the duct 23a are a plurality of radial ducts 28a.

The outer end of the valve 25a is formed with a recess 25a' which receives a compression spring 30a reacting between the cap 22a and the valve to urge the latter to its closed position as shown. The inner surface of the cap 22a is hollowed out to form a fluid chamber 31a which, when the valve is unseated or open, will be in communication with the annular duct 23a surrounding the valve seat, this through the duct 27a and ducts 28a. A plurality of parallel ducts 29a, arranged around the axis of the valve, are formed in the valve seat 20a connecting the chamber 31a with a relatively large through-bore 10' formed on the base 10 for receiving a cam shaft 34 as described below.

A packing ring 32a may be fitted on the valve body 25a to prevent leakage of the fluid from the duct 23a into the through-bore 10'. The inner end of the valve 25a is formed with a bearing nose portion 33a which extends into the bore 10' and by means of which the valve is actuated, all as described below. It will be understood, therefore, that the valve assembly 14a comprises a balanced poppet valve wherein the pressure of the fluid on either side thereof does not impair freedom of valve movement. It will also be understood that the valves 14a . . . 14d comprise a selector valve assembly for controlling the flow in the output circuit including ports 17A, 17B and 18A, 18B.

To actuate the several valves 14a . . . 14e, the cam shaft 34 is rotatably journalled in the base portion 10, the outer end of the shaft having affixed thereto the hand lever 14. The cam shaft 34 is self-centering by means of springs 35 and a slider plate 36. An end plate 37, fastened to the housing by fillister head screws 38, secures the cam shaft 34 against axial movement. The cam shaft 34 carries two double-surface cams 39 and 40 for actuating the valves 14a, 14c and 14b, 14d respectively. The cam shaft also carries a single surface cam 41 for actuating the vertical valve 14e. The cam surfaces are so arranged on the shaft 34 that a neutral position or either of two operative positions may be selected by the hand lever 14. In the neutral position the valve 14e is cammed open and the valves 14a . . . 14d are all closed. In a first operative position valves 14e, 14b and 14c are closed and valves 14a and 14d are open; in the second operative position valves 14e, 14a and 14d are closed, while valves 14b and 14c are open.

Fitted between the cam shaft 34 and the wall of the bore 10' in which it is received are three packing rings 42, 43 and 44 as best seen in Fig. 3, axially spaced on the shaft 34 to define two fluid receiving chambers 45 and 46. The inner ends of the valves 14a and 14c are disposed in the fluid chamber 46, whereas the inner ends of the valves 14b and 14d are disposed in the fluid chamber 45. Also the lower or innermost end of the vertically disposed valve 14e is in communication with the fluid chamber 46.

Figure 8:
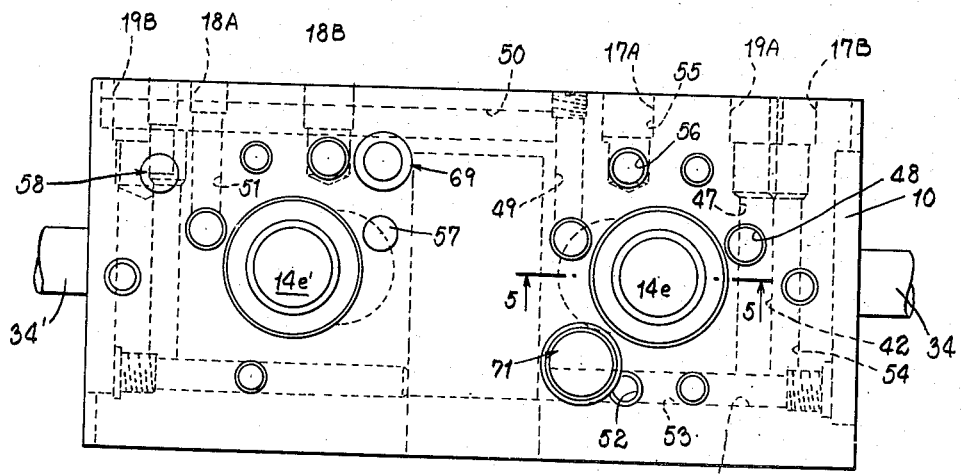
Fig. 8 is a view in horizontal section of the lower portion of the housing assembly taken on the line 8—8 of Fig. 4, looking in the direction of the arrows.

Referring now to Figs. 3, 4 and 8, it will be understood that the fluid input or supply port for the unit 19A, which receives fluid under pressure from the external pump P (Fig. 1), is connected by a horizontal duct 47 and a vertical duct 48 (Fig. 8) to discharge into the fluid chamber 46 around the cam shaft 34. The output side of the valve 14e, commencing with the circular duct 23e (Fig. 5), communicates with a horizontal duct 49 (Fig. 8), which discharges into a second horizontal duct 50, and a third horizontal duct 51 which discharges into a chamber (not shown) surrounding the left hand cam shaft 34' and which corresponds to the chamber 46 on the right hand side. It will be understood that the left hand side of the unit is substantially a duplication of the right hand side of the unit and need not be described in detail herein for a complete understanding of the invention, although it will be understood that the right and left hand sides of the unit are cooperative in their action.

Referring again to Fig. 3, it will be recalled that the inner ends of the valves 14a and 14c communicate with the fluid chamber 46 which receives fluid under pressure from the supply source. The output side of the valve 14c, beginning with the circular duct 23c, communicates with a vertical duct 52, the horizontal duct 53 and a second horizontal duct 54 which communicates with the port 17B of the first output circuit. The other port 17A, which operates in cooperation with the port 17B in the first output circuit, communicates by means of a horizontal duct 55 and a vertical duct 56, with the two circular ducts 23a and 23b (Fig. 3) which surround the valves 14a and 14b respectively.

As best seen in Fig. 8, the outlet side of the left hand vertical valve 14e' discharges by means of a vertical conduit 57 into the reservoir 11' formed on the top of the unit. The outlet from the reservoir comprises a standpipe 58 which communicates with the outlet or discharge port 19B by means of which the fluid is returned to the pump.

Figure 7:
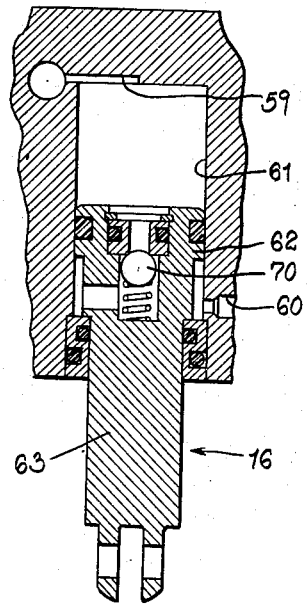
Fig. 7 is a view in horizontal section taken on the line 7—7 of Fig. 2 looking in the direction of the arrows and showing the structural detail of the hand pump.

The hand pump 16 is provided so that if desired, or if necessary for any reason, fluid pressure may be developed by hand to actuate the system. To this end the hand pump 16 is connected by means of a conduit 59 (Fig. 1) to the reservoir 11' and by a conduit 60 to the input duct 47. The hand pump piston structure is shown in detail in Fig. 7 and includes a cylinder 61 which receives a piston 62 connected by a piston rod 63 and connecting link 64 to the lower end of a hand lever 65 (Fig. 2) having a fulcrum pivot 66 attached to the frame of the unit by means of a connecting link 67 pivoted to a bracket 68 bolted to the base 10 of the unit.

According to well known principles, the pump 16 embodies a first ball check valve 69 (Fig. 4) in the input or suction conduit from the reservoir 11', and a second ball check valve 70 disposed on the piston 62 and disposed on the pressure or output side of the pump. The ball check valve 69 opens on the outward stroke of the piston 62 to permit a flow of fluid from the reservoir into the pump cylinder 61. On the inward stroke of the piston the check valve 69 closes and the check valve 70 opens to admit fluid behind the back of the piston. The physical displacement of the piston develops pressure in the output conduit 60 on the inward stroke of the piston, and on the outward stroke thereof pressure developed by the piston motion.

Figure 2:
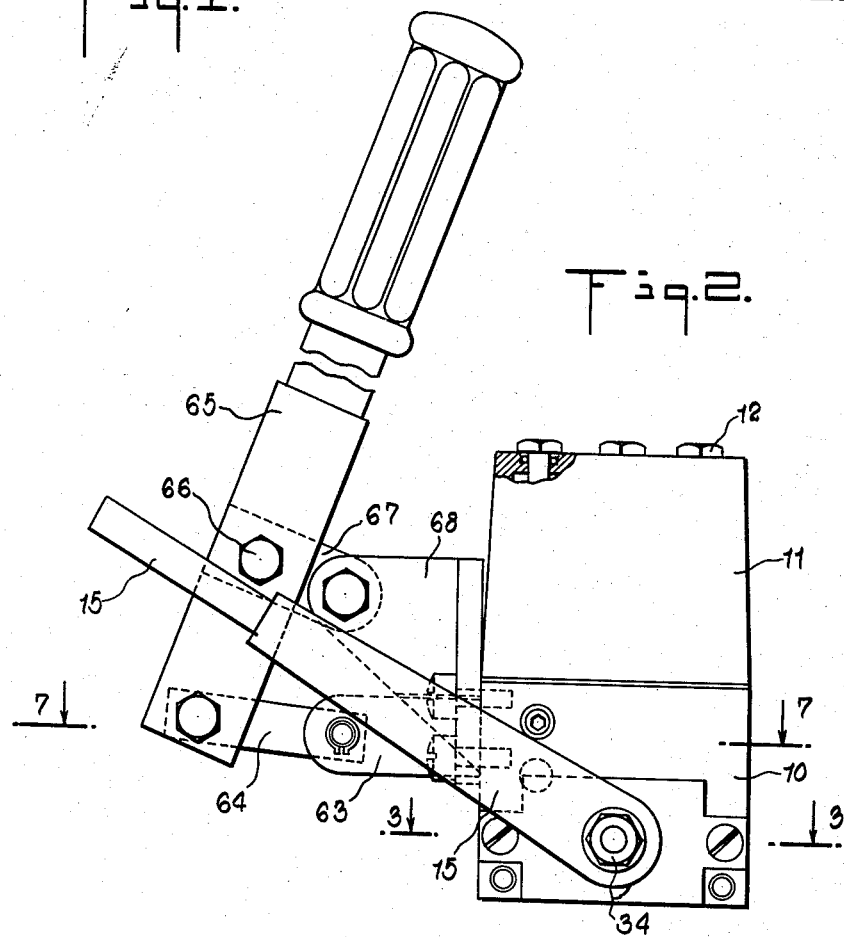
Fig. 2 is an end view of a unitary housing for accommodating the selector valves.

A pressure relief valve assembly 71 is connected between the input pressure line 47 of the system and the reservoir 11' by means of conduits 72 and 73 (Figs. 1 and 6). This pressure relief valve 71 is shown in detail in Fig. 6 and operates according to well known principles whereby a ball valve 74 is spring-biased against a valve seat 75 by means of a spring and plunger assembly 76. The pressure urging the ball 74 against the seat may be adjusted by means of a sleeve 77 threaded into the check valve housing to vary the compression of the spring. When the pressure in the duct 72 exceeds a preestablished value the ball 74 raises from its seat and fluid is permitted to flow through the conduit 73 to the reservoir 11'.

The structure of the unit having been described above, the operation of the system and flow paths of the fluid will now be described. It will be recalled that the hand lever 14 has a neutral and two operative positions. In the neutral position a fluid circuit will be established which may be traced from the pressure input port 19A, through the ducts 47 and 48 to the fluid chamber 46 surrounding the cam shaft 34 and defined by the packing rings 43 and 44. From the chamber 46 fluid passes through the valve assembly 14e (which is open in the neutral position of the hand lever) by means of the vertical ducts 29e (Fig. 5), the fluid chamber 31e at the upper end of the valve, the duct 27e adjacent the valve seat, the radial ducts 28e and the circular duct 23e surrounding the valve seat.

The output side of the valve 14e discharges into the chamber 45 surrounding the shaft 34, from which point it flows into the horizontal duct 49 (Fig. 8), which connects by means of the duct 50 to the left hand side of the unit. Assuming for the time being that the left hand valve 14e', corresponding to the valve 14e, is open, fluid will flow through the duct 51 through the valve 14e' and through the duct 57 into the reservoir 11'. Fluid leaves the reservoir through the standpipe 58 which connects with the fluid discharge port 19B. Thus it will be understood that the fluid circuit described above comprises, in effect, a by-pass conduit whereby fluid may pass directly through the unit.

When the hand lever 14 is moved to its first operative position, the cam shaft 34 causes the diagonally opposed valves 14c and 14b to open and the valve 14e to close. This closes the by-pass conduit through the unit and establishes a flow from the input port 19A, through ducts 47 and 48 to the chamber 46. From the chamber 46 fluid passes the open valve 14c by means of ducts 29c, chamber 31c, duct 27c, duct 28c, duct 23c to the duct 52. Duct 52 connects with horizontal ducts 53 and 54 (Fig. 8) which establishes a flow of fluid in the first output circuit through the port 17B. Returning from the output circuit fluid enters the port 17A, flows through ducts 55 and 56 to engage the valves 14a and 14b. Since valve 14b is open flow continues through duct 23b, ducts 28b and 27b into the chamber 31b at the head of the valve 14b. Passing through the open valve the fluid flows into the ducts 29b to the chamber 45 surrounding the shaft 34. From this point flow continues through the left hand side of the unit as described above, by means of the by-pass conduit and valve 14e'.

Moving the hand lever 14 to the second operative position closes valves 14c and 14b and closes also valve 14e. Valves 14a and 14d however, are now open. This serves to reverse the flow of fluid in the first output circuit by establishing a flow out of the port 17A and in the port 17B. The fluid path is traced from the input port 19A, through ducts 47 and 48 to chamber 46, and through open valve 14a to the port 17A. Returning now by way of the port 17B, fluid passes through ducts 54 and 53 to the open valve 14d. From valve 14d fluid enters the chamber 45, after which flow continues to the left hand side of the unit, all as described above.

As stated the left hand side of the unit is controlled by the hand lever 15 and is substantially identical to that described above with reference to the hand lever 14. Thus the left side of the unit includes a series of four poppet valves (not shown) arranged similarly to the poppet valves 14a . . . 14d, and the fifth valve 14e' which, as described above, corresponds to the valve 14e. Thus the valve 14e' is connected in series with the valve 14e in the by-pass conduit through the unit. Now by operating the left-hand lever 15 the flow of fluid may be made to pass through the valve 14e' into the reservoir, this being the neutral position, or the fluid may be made to flow in either direction in the second output circuit connected to the ports 18A and 18B.

It will be understood, therefore, that the two output circuits may be operated independently of each other from a single source of fluid under pressure. It is to be noted, however, that by selecting hydraulic apparatus such as conventional hydraulic jacks to be operated by the output circuits, the two output circuits may be made mutually dependent, i. e. one circuit may be rendered inoperative by the other, simply by maintaining one of the hand levers in an operative position after the jack has reached the end of its stroke. At such time the flow of fluid through the system will be momentarily blocked.

Thus it will be apparent that a highly compact and efficient selector valve arrangement is provided according to the invention for controlling the flow of hydraulic fluid under pressure. It will be understood, however, that the housing arrangement for the valves and the ducts and conduits provided for accommodating the flow of fluid may be widely varied in design without departing from the scope of the invention. Accordingly the form of the invention disclosed herein should be considered as illustrative and not as limiting the scope of the following claims.

What is claimed is:

1. In hydraulic apparatus for controlling the flow of fluid in first and second output circuits, each circuit having supply and return lines, means forming a by-pass conduit for receiving a flow of fluid under a pressure differential, first and second by-pass valves connected in series in the by-pass conduit, means connecting the supply and return lines of the first output circuit to the by-pass conduit respectively on opposite sides of the first by-pass valve, means connecting the supply and return lines of the second output circuit to the by-pass conduit respectively on opposite sides of the second by-pass valve, third and fourth valves connected respectively in series with the supply and return lines of the first output circuit, fourth and fifth valves connected in series respectively with the supply and return lines of the second output circuit, first control means for closing the first by-pass valve and opening the third and fourth valves, and second control means for closing the second by-pass valve and for opening the fourth and fifth valves.

2. Apparatus as set forth in claim 1 including a unitary housing for receiving said valves and by-pass conduit, said first and second control means comprising a pair of rotatable cam shafts journaled in the housing and movable independently, and means defining a reservoir chamber in said housing into which the by-pass conduit discharges.

3. Apparatus as set forth in claim 2 including a hand pump carried by the housing and connected between the reservoir and the input side of the by-pass conduit.

4. In hydraulic apparatus for controlling the flow of fluid in first and second output circuits, each circuit having functionally interchangeable supply and return lines for the fluid; a by-pass conduit for receiving a flow of fluid under a pressure differential; first and second by-pass valves connected in series in the by-pass conduit; means including a third valve connecting one line of the first output circuit to the by-pass conduit on one side of the first by-pass valve and means including a fourth valve connecting the said one line to the other side of the first by-pass valve; means including a fifth valve connecting the other line of the first output circuit to one side of the first by-pass valve and means including a sixth valve connecting said other line to the by-pass conduit on the other side of the first by-pass valve; first control means for closing said by-pass valve and opening the third and sixth valves, or, selectively, for closing the by-pass valve and opening the fourth and fifth valves; means including a seventh valve connecting the first line of the second output circuit to the by-pass conduit on one side of the second by-pass valve and means including an eighth valve connecting said first line to the other side of the second by-pass valve; means including a ninth valve connecting the second line of the second output circuit to one side of the second by-pass valve, and means including a tenth valve connecting said second line to the other side of the second by-pass valve; and second control means for closing the second by-pass valve and opening the seventh and tenth valves or, selectively, for closing the by-pass valve and opening the eighth and ninth valves.

5. In hydraulic apparatus for controlling the flow of fluid in first and second output circuits, each circuit comprising a supply and return line, fluid input means for receiving fluid under pressure and fluid discharge means, means forming a by-pass conduit for conducting the fluid directly through the apparatus between the input and discharge means, first and second control members for controlling the flow of fluid in the first and second output circuits, respectively, each of said control members having a neutral and at least one operative position, first and second normally closed valves in the supply and return lines, respectively, of the first output circuit and adapted to be opened by the first control member upon movement of the latter to its operative position, a normally open first by-pass valve operated by said first control member and disposed in the by-pass conduit between the input and discharge means, said first by-pass valve being open in the neutral position of the first control member and closed in the operative position thereof, duct means connecting the input side of the first valve to the by-pass conduit on the input side of the first by-pass valve and duct means connecting the output side of the second valve to said by-pass conduit on the output side of the first by-pass valve, normally closed third and fourth valves connected in series with the supply and return lines, respectively, of the second output circuit, a normally open second by-pass valve connected in the by-pass conduit at a point beyond the connection of the return line of the first output circuit to the by-pass conduit, duct means connecting the output side of the third valve to the by-pass conduit between the first and second by-pass valves, duct means connecting the input side of the third valve to the by-pass conduit between the first and second by-pass valves, duct means connecting the output side of the fourth valve to the by-pass conduit on the output side of the second by-pass valve, said second control member being adapted to open the third and fourth valves and close the second by-pass valve by the movement of its operative position and to open the second by-pass valve and close the third and fourth valves upon movement of its neutral position, whereby operation of either one of said control members renders one of said output circuits operative without disabling the other output circuit.

6. Hydraulic apparatus as set forth in claim 5, including a fluid reservoir and a hand pump connected between the reservoir and the said input means.

7. In hydraulic apparatus, a first output circuit having first and second cooperative output conduits adapted to be operated interchangeably as supply and return lines for actuating an external hydraulic device, a fluid input line for receiving fluid under pressure and a fluid discharge line, means forming a by-pass fluid conduit between the input line and the discharge line, a first by-pass valve connected in series in said by-pass conduit, a series of four valves, duct means connecting the input side of the first and second valves to the by-pass conduit on the input side of the by-pass valve, duct means connecting the output side of the first and second valves to the first and second conduits, respectively, duct means connecting the output sides of the third and fourth valves to the by-pass conduit on the output side of the by-pass valve, duct means connecting the input side of the third and fourth valves to the first and second output conduits, respectively, on the output sides of the first and second valves, unitary control means for operating said valves, said control means having a neutral and first and second operative positions, said by-pass valve being open in the neutral position and closed in the first and second positions, said series of four valves being closed in the neutral position and the second and third valves being open in the first position and closed in the second position, and said first and fourth valves being closed in the first position and open in the second position.

8. Hydraulic apparatus as set forth in claim 7, including a second by-pass valve connected in the by-pass conduit at a point beyond the duct connection between the third and fourth valves and the by-pass conduit, and second control means for operating the second by-pass valve independent of the said unitary control means.

9. Hydraulic apparatus as set forth in claim 7, including a fluid reservoir and a hand pump connected between the reservoir and the said input means.

10. An hydraulic system as set forth in claim 7, including a second series of four valves including fifth, sixth, seventh and eighth valves, a second by-pass valve connected in series with the said by-pass valve in the by-pass conduit, a second output circuit including third and fourth output conduits adapted to be operated interchangeably as supply and return lines for actuating an external hydraulic device, duct means connecting the input sides of the fifth and sixth valves to the by-pass conduit at a point between the first and second by-pass valves, duct means connecting the output sides of the fifth and sixth valves, respectively, to the third and fourth output conduits, duct means connecting the output side of the seventh and eighth valves to the by-pass conduit on the output side of the second by-pass valve, duct means connecting the input sides of the seventh and eighth valves to the fourth and third output conduits respectively, second unitary control means for actuating the second series of four valves and the second by-pass valve, said control means having a neutral and first and second operative positions, said second by-pass valve being open in the neutral and closed in the first and second positions said series of four valves being closed in the neutral position, the fifth and eighth valves being open in the first position and closed in the second position, and said sixth and seventh valves being closed in the first position and open in the second position, whereby operation of one of said unitary control means renders one of said output circuits operative without disabling the other.

11. Hydraulic apparatus as set forth in claim 7, including a fluid reservoir and a hand pump connected to pump fluid from the reservoir to the said input line.

BENJAMIN N. ASHTON.

References Cited in the file of this patent

UNITED STATES PATENTS

| Number | Name | Date |
|---|---|---|
| 2,203,939 | Barrett | June 11, 1940 |
| 2,247,140 | Twyman | June 24, 1941 |
| 2,328,606 | Boldt | Sept. 7, 1943 |
| 2,349,069 | Ashton | May 16, 1944 |
| 2,376,322 | Benway | May 22, 1945 |
| 2,397,299 | Strid | Mar. 26, 1946 |